US009346445B2

(12) United States Patent
Anderson et al.

(10) Patent No.: US 9,346,445 B2
(45) Date of Patent: May 24, 2016

(54) HYDRAULICALLY ASSISTED HYDRAULIC BRAKING SYSTEM

(75) Inventors: Chris Anderson, Paris (FR); Aleksander Hurwic, Paris (FR); Bruno Beylerian, Louvres (FR)

(73) Assignee: Robert Bosch GmbH, Stuttgart (DE)

( * ) Notice: Subject to any disclaimer, the term of this patent is extended or adjusted under 35 U.S.C. 154(b) by 690 days.

(21) Appl. No.: 13/380,080

(22) PCT Filed: Jun. 11, 2010

(86) PCT No.: PCT/EP2010/058215
§ 371 (c)(1),
(2), (4) Date: Dec. 22, 2011

(87) PCT Pub. No.: WO2010/149510
PCT Pub. Date: Dec. 29, 2010

(65) Prior Publication Data
US 2012/0090315 A1    Apr. 19, 2012

(30) Foreign Application Priority Data

Jun. 25, 2009   (FR) ...................................... 09 03105

(51) Int. Cl.
*B60T 13/68*   (2006.01)
*B60T 7/04*    (2006.01)
(Continued)

(52) U.S. Cl.
CPC .............. *B60T 13/686* (2013.01); *B60T 7/042* (2013.01); *B60T 8/321* (2013.01); *B60T 8/3265* (2013.01); *B60T 8/4086* (2013.01); *B60T 8/441* (2013.01);
(Continued)

(58) Field of Classification Search
CPC .................................. B60T 8/17; B60T 13/68
USPC ..................................................... 60/545, 404
See application file for complete search history.

(56) References Cited

U.S. PATENT DOCUMENTS 4,707,758 A * 11/1987 Matsuda .......................... 361/18
5,031,968 A *  7/1991 Takata ............................ 303/15
(Continued)

FOREIGN PATENT DOCUMENTS

JP    H06305412    11/1994
JP    2003335230   11/2003

OTHER PUBLICATIONS

PCT/EP2010/058215 International Search Report dated Jul. 28, 2010 (5 pages).

*Primary Examiner* — Nathaniel Wiehe
*Assistant Examiner* — Matthew Wiblin
(74) *Attorney, Agent, or Firm* — Michael Best & Friedrich LLP

(57) ABSTRACT

Electro-hydraulically boosted hydraulic braking system having a master cylinder (100) including a thrust chamber (105) and on command receives pressurized brake fluid from an accumulator (300) via an electrically operated valve (200) controlled by a computer (400) on the basis of the signal supplied by the brake pedal (411) sensor (410), and an electrical power source (450) powering at least the electrically operated valve (200), the computer (400) and the sensor (410). An auxiliary generator (470) is connected in a manner that is controlled (472) by the computer (400) to the circuit (L0, L1, L2, L3) powering the computer (400), the sensor (410) and the electrically operated valve (200) if failure of the main source (450) is detected so as to allow emergency operation of the electrically operated valve (200) and allow the brake circuit (C1, C2) to be powered for a limited number of braking actions.

7 Claims, 2 Drawing Sheets

(51) Int. Cl.
  *B60T 8/32* (2006.01)
  *B60T 8/40* (2006.01)
  *B60T 8/44* (2006.01)
  *B60T 13/14* (2006.01)
  *B60T 17/22* (2006.01)

(52) U.S. Cl.
  CPC ............ *B60T 13/141* (2013.01); *B60T 13/145* (2013.01); *B60T 17/22* (2013.01)

(56) References Cited

U.S. PATENT DOCUMENTS

| | | | |
|---|---|---|---|
| 5,686,894 A * | 11/1997 | Vig et al. | 340/618 |
| 6,152,545 A | 11/2000 | Mauser et al. | |
| 2003/0233179 A1* | 12/2003 | Matsubara et al. | 701/36 |
| 2007/0222284 A1* | 9/2007 | Matsubara et al. | 303/122.04 |
| 2009/0326767 A1* | 12/2009 | Kamada et al. | 701/48 |

* cited by examiner

HYDRAULICALLY ASSISTED HYDRAULIC BRAKING SYSTEM

BACKGROUND OF THE INVENTION

The present invention relates to a hydraulically boosted hydraulic braking system comprising:
- a master cylinder comprising a thrust chamber and on command receiving pressurized brake fluid from an accumulator via an electrically operated valve controlled by a computer on the basis of the signal supplied by the brake pedal sensor,
- an electrical power source powering at least the electrically operated valve, the computer and the sensor.

In the event of failure of the electrical supply afforded by the on-board circuit, which is typically an alternator and a 12-volt lead-acid battery, the brakes cannot operate without boosting because the electro-hydraulic boosting disappears: the electrically operated valve that controls the supply to the control chamber of the master cylinder cannot be actuated which means that even if the pressure accumulator contains a reserve of pressurized fluid, this reserve cannot act on the master cylinder to bring about a braking action.

Emergency operation can be afforded only mechanically via a control rod driven by the brake pedal which then operates the primary piston of the master cylinder directly.

When operating the brakes in this failure situation the driver has to supply a thrust that corresponds to the sum of the thrust needed to control the piston of the master cylinder (or the primary piston in the case of a tandem master cylinder) and of the reaction applied by any brake simulator that might be present.

The braking operation becomes awkward if not difficult in some cases especially for a driver who is not strong enough to brake without the assistance of a brake booster.

This situation becomes all the more paradoxical when, in the event of the failure of the vehicle electrical power system, the pressure accumulator may still be full and still be capable of providing hydraulic control of the master cylinder for a few braking actions.

SUMMARY OF THE INVENTION

It is the object of the present invention to develop a hydraulically or electro-hydraulically boosted hydraulic braking system that allows temporary emergency operation so that the vehicle can still be braked in the event of failure of the vehicle onboard electrical network.

To this end, the invention relates to a hydraulic braking system of the type defined hereinabove, characterized in that an auxiliary electrical power source is connected to the circuit powering the computer, the sensor and the electrically operated valve if failure of the main electrical power source is detected so as to allow emergency operation of the electrically operated valve and allow the brake circuit to be powered for a limited number of braking actions.

Thus, according to the invention, the auxiliary electrical power source provides backup emergency operation in that it is connected only to the essential components of the hydraulic braking system that will allow the brake master cylinder to be actuated hydraulically in the event of failure of the onboard electrical network, assuming that there is a sufficient reserve of pressurized fluid in the pressure accumulator.

This solution does not exclude, as a last resort, direct mechanical operation of the master cylinder via the brake pedal using an action applied to the pedal and which exceeds the reaction applied by any brake simulator there might be interposed between the pedal and the master cylinder and therefore exerting on the piston of the master cylinder the thrust necessary to create the braking pressure in the brake circuit or circuits controlled by the master cylinder.

The hydraulic braking system according to the invention makes it possible, at low cost, to afford electro-hydraulic brake boosting in the event of a breakdown of the main electrical circuit.

In a particularly advantageous manner, the brake boosting control members, typically the electrically operated valve, the computer and the sensor, are connected to the main electrical power source independently of the on-board electrical circuit, powered directly by the main electrical power source. That simplifies the management of the vehicle electrical circuits because this separation means that the electrically operated valve, the computer and the sensor can then be powered independently and by themselves in the event of failure of the main source. There is no risk of needlessly exhausting the auxiliary source by powering consumers that might be connected to the on-board circuit.

This connection which is controlled by an electronic switch means that the power lines for the electrically operated valve, the computer and the sensor to which lines the main source is connected can be used without the risk of the auxiliary source draining into the main source of which the connection to the circuit is fitted with a one-way electronic component such as a diode which prevents the main source from being recharged from the auxiliary source.

The auxiliary source advantageously consists of a small battery or cell with sufficient capacity to actuate the emergency means (the electrically operated valve, computer and sensor) a small number of times in order to boost the braking.

The auxiliary source is advantageously connected to a status indicator which indicates that the auxiliary source is in operation, thus alerting the driver on the one hand to the fact that the main source is defective and on the other hand, during ongoing braking actions, that the auxiliary source is operating. That encourages the driver to economize on braking or for preference to use the electrical power still available in order to bring the vehicle to a standstill.

According to another advantageous feature, the electronic switch that controls the operation of the auxiliary source is a thyristor.

According to another advantageous feature, the connection between the other electrical consumer of the electro-hydraulic boosting system, namely the electrically operated pump, is independent of the circuit powering the electrically operated valve, the computer and the sensor and, in particular, this connection is made directly with the on-board network. That does not exclude control of the electrically operated pump being had via the computer according to the pressure accumulator pressure demand.

BRIEF DESCRIPTION OF THE DRAWINGS

The present invention will be described in greater detail hereinafter using an exemplary embodiment of an electro-hydraulically boosted hydraulic braking system which is depicted in the attached drawings in which.

DETAILED DESCRIPTION

Figure 1:
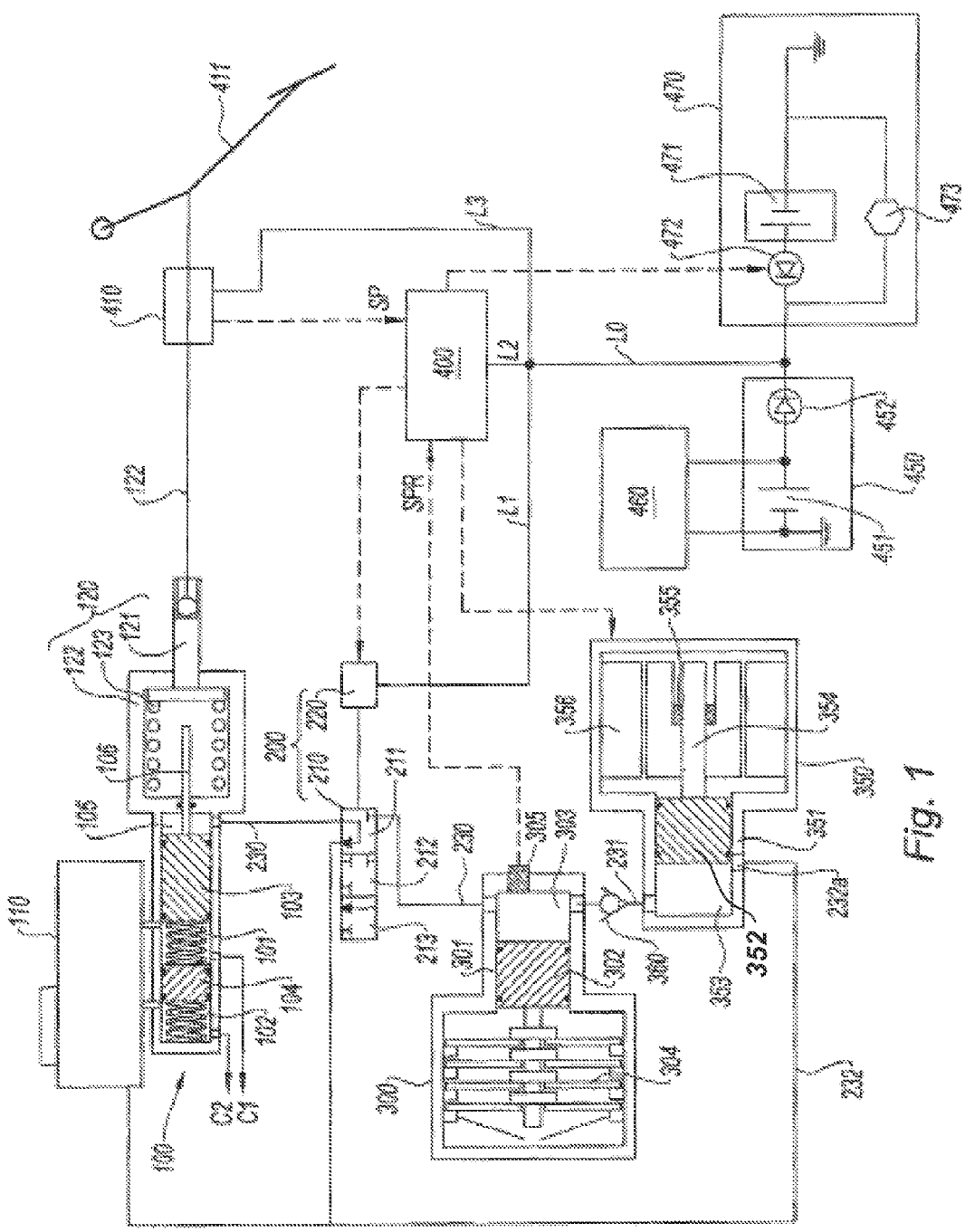
FIG. 1 shows the hydraulic braking system according to the invention at rest.

According to FIG. 1, the electro-hydraulically boosted hydraulic braking system according to the invention is made up of a master cylinder 100, in this instance a tandem master cylinder, which on command supplies two independent braking circuits C1, C2 with pressurized hydraulic fluid. The master cylinder 100 is equipped with a brake fluid reservoir 110. It comprises a thrust chamber 105 supplied, on demand, with pressurized hydraulic fluid through an electrically operated valve 200 from a pressurized fluid accumulator 300 itself supplied from a source of pressurized brake fluid, typically a master cylinder piston of which is driven by a motor, advantageously an electric motor, or by an electrically operated pump 350 connected to the hydraulic fluid reservoir 110.

Operation of the braking system is managed by a computer 400 connected to a sensor 410 with which the brake pedal 411 is equipped.

Electrical power is supplied from a main electrical power source 450 that powers the on-board circuit 460 of the vehicle. This circuit 460, which may be complex, is depicted symbolically as a rectangle which represents all the users and consumers of electrical current. An auxiliary source 470 is connected to a certain component of the hydraulic braking system.

The brake pedal 411 is also connected to the master cylinder 100 via a transmission member 120.

In more detail:

The tandem master cylinder 100 comprises two chambers 101, 102 separated by a floating piston or secondary piston 104. Each of the chambers is separately connected to its own braking circuit C1, C2 and supplied separately from the reservoir 110. The tandem master cylinder 100 comprises a primary piston 103 delimiting a control chamber 105 that receives pressurized hydraulic fluid to control actuation of the master cylinder.

The piston 103 is driven by a control rod 122 namely, as illustrated, the tandem master cylinder 100 is equipped with the transmission member 120 which operates both like a brake simulator and as an emergency mechanical transmission member.

The braking sensor 410 detects movement of the brake pedal 411 transmitted to the control rod 122 and provides the computer 400 with a signal SP.

The electrically operated valve 200 installed in the supply line 230 leading from the accumulator 300 to the control chamber 105 of the tandem master cylinder 100 is made up of a spool 210 and of an electromagnetic actuator 220 controlled by the computer 400 and electrically powered from the main source 450 via a line L1.

The spool 210 has three sectors 211, 212, 213 which, when brought into the active position, respectively:

a) cause return from the chamber 105 to the reservoir 110 and cut off the outlet of the accumulator 300, b) cut off the chamber 105 and the outlet of the accumulator 300, c) cause communication between the chamber 105 and the accumulator 300.

Position (a) is the neutral position of the braking system. No pressure is applied to the brake pedal and the braking circuits C1, C2 are neutralized.

Position (b) is the blocked position: the control chamber 105 of the master cylinder is blocked and this blocks the master cylinder in the position in which its pistons 103, 104 were located at the moment that the spool 210 moved into position (b). This position (b) also blocks the chamber 303 of the accumulator 300. This position allows the brake boosting to be kept constant without using up brake fluid.

Position (c) is the active position of the braking system, which means to say that it allows the tandem master cylinder 100 to be controlled from the accumulator 300 by the pressurized fluid of the accumulator feeding into the chamber 105 throughout the length of time for which the spool of the electrically operated valve remains in this position (c).

The pressurized fluid accumulator 300 is made up of a cylinder 301 in which a piston 302 delimits a chamber 303 receiving pressurized fluid. The piston 302 is connected to a bunch of opposing springs 304 which can be pushed back by the piston 302 only if it is itself subjected to pressurized fluid in the chamber 303.

The chamber 303 is equipped with a pressure sensor 305 which transmits a pressure signal SPR to the computer 400. The computer 400 compares this pressure signal SPR to a reference signal and, on the strength of this comparison, commands the supply of pressurized fluid to the chamber 303.

The chamber 303 is connected at outlet to the line 230 upstream of the electrically operated valve 200. The inlet of the chamber 303 is connected by a line 231 equipped with the non-return valve 360 to the electrically operated compressor 350. The valve 360 opens in the direction from the electrically operated compressor 350 towards the chamber 303.

The electrically operated compressor 350 has a structure similar to that of the accumulator except that the bundle of springs is replaced by a motor so that a piston can be operated as a compressor.

Thus, the electrically operated compressor 350 comprises a cylinder 351 in which a piston 352 delimits a pressure chamber 353. The piston 352 is moved by a worm transmission in which the worm is formed of a threaded rod connected to the piston rod 354 or partially consists thereof, and onto which is screwed a nut 355 that is free to turn but prevented from translational movement, the threaded rod itself being free in terms of translational movement but prevented from turning. The nut 355 is driven by an electric motor 356. The drive system provides step-down gearing such that a high delivery pressure can be established.

The electric motor 356 is controlled by the computer 400 and electrically powered from the main source 450.

The pressure chamber 353 is connected at outlet to the line 231 upstream of the non-return valve 360 and its inlet is connected by the line 232 to the reservoir 110. The piston 352 cuts off the inlet 232a of the chamber 353 by closing it off for a certain position of travel, in order thereafter to deliver pressurized fluid from the chamber 353 into the accumulator 300 against the opposing thrust of the springs 304 until the pressure in the chamber 303 of the accumulator 300 reaches the reference pressure.

The main electrical power source 450 is made up of the battery 451, typically the lead-acid battery of the vehicle, which is recharged from the on-board circuit 460 by the generator that has not been depicted. The main source 450 is connected separately from the on-board circuit 460 to the line L0 which is connected:

to the line L1 powering the actuator 220 to the line L2 powering the computer 400, and to the line L3 powering the sensor 410.

The main source 450 is connected to the line L0 via a diode 452 or equivalent component which allows current to pass only from the accumulator 451 towards the line L0.

The auxiliary source 470 is made up of a small-capacity battery 471 or of a cell connected to the line L0 via an electronic switch 472.

In general, the auxiliary source may, in place of a battery, contain a lithium cell, for example one to four CR123A cells, one to three lithium batteries, for example the type 16340 or 18650 battery or a capacitor. As an alternative, in normal operation, the voltage of the main circuit is slightly higher than that of the auxiliary source which is recharged when necessary, in the event of it being a rechargeable generator (battery, capacitor) by the main source, the diode 452 preventing passage in the opposite direction. In another alternative form, a circuit for recharging the auxiliary source is incorporated, keeping the auxiliary source on charge, at a very low current (capacitor, Ni—MH, Ni—Cd battery), stopping charging when the battery reaches the desired level of charge (lithium battery). This switch 472 such as a thyristor is controlled by the computer 400 to open and allow the auxiliary source 470, 471 to power the line L0 if braking is demanded by action on the pedal 411 and the main source 450 is defective. The computer 400 measures the voltage or the current that it receives from the main source 450 and, in the event of a drop in voltage or no supply current, it switches the switch 472 so that the auxiliary source 470 can take over.

The auxiliary source 470 also comprises a status indicator 473 such as a lamp detecting that current is passing from the battery 471. This lamp is installed for example on the dashboard of the vehicle to draw the attention of the driver to the fact that he is on emergency operation.

This source cannot discharge into the main source 450 because of the blocking performed by the diode 452, and is limited to the emergency powering of the computer 400, of the braking sensor 410 and of the actuator 220 of the electrically operated valve 200; the latter can thus via the spool 210 control the supply of pressurized fluid from the accumulator chamber 303 to the thrust chamber 105.

Under conditions of normal operation, the master cylinder 100 is controlled as will be seen hereinafter by the pressurized brake fluid circuit 300, 350 until the piston 121 of the simulator 120 touches the rod 106 of the piston 103 of the master cylinder 100 because of detection of movement and amplitude of movement of the brake pedal 411 by the sensor 420 and the reaction generated by the computer to control the master cylinder 100 using the pressurized hydraulic fluid.

Operation of the electro-hydraulically boosted hydraulic braking system is as follows:

According to FIG. 1, when the brake pedal 411 is not actuated, the spool of the electrically operated valve 200 is in the position (a) shown. It connects the control chamber 105 of the master cylinder to the brake fluid reservoir 110. The master cylinder 100 is in a position of rest. The electrically operated valve 200 also cuts off the line 230 connecting the accumulator 300 to the control chamber 105 of the master cylinder so that the chamber 303 of the accumulator 300 is isolated.

If, because the brakes have been operated beforehand, the pressure in the chamber 303 of the accumulator 300 is below the set threshold, the computer 400 commands the electrically operated compressor 350 to supply pressurized fluid to the accumulator 300.

Figure 2:
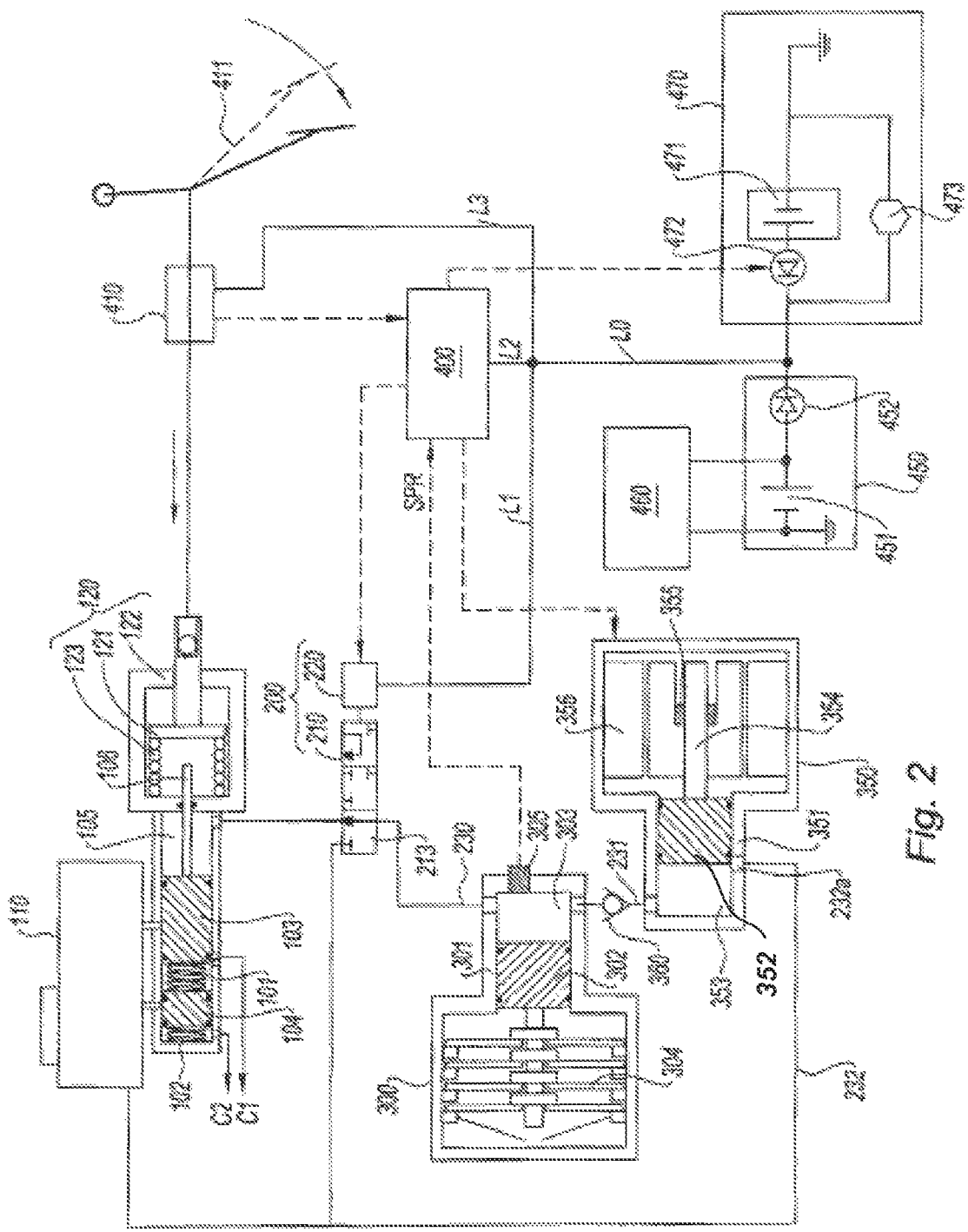
FIG. 2 shows the braking system according to the invention in the active position.

According to FIG. 2, if the brake pedal 411 is actuated, the movement is detected by the sensor 410 which transmits a signal SP to the computer 400. The computer 400 controls the actuator 220 of the electrically operated valve 200 to move the spool 210 to the position (c) depicted in FIG. 2. In this position, the spool 210 places the chamber 303 of the accumulator 300 in communication with the control chamber 105 of the master cylinder 100 and this pushes back the primary piston 103 and, where appropriate, the secondary piston 104 of the master cylinder (in the case of a tandem master cylinder) to send pressurized brake fluid to the brake circuits C1, C2.

If, at the moment of commanding a braking action, the computer 400 discovers that the primary electrical power source 450 has failed, for example because the battery 451 is flat, it commands the semiconductor 472 to connect the auxiliary electrical power source 470 to the electric circuit L0, L1, L2, L3 consisting of the computer 400, the sensor 410 and the actuator 220 of the electrically operated valve 200. The computer 400 is thus able to respond to an action on the brake pedal 411 by moving the spool 210 of the electrically operated valve 200 from the neutral position (a) of FIG. 1 into the active position (c) of FIG. 2.

The reserve consisting of the auxiliary source 470 is enough to allow a few actuations of the electrically operated valve 200 and thus provide emergency control of the brake circuits C1, C2.

This emergency actuation also assumes that the reserve of pressurized fluid in the pressure accumulator 300 is enough to operate the master cylinder 100.

Advantageously, the accumulator 300 is sited close to the thrust chamber 105 so as to limit pressure drops along the line 230.

Of course, the thrust chamber 105 is advantageously also used for active braking modes.

In a third alternative form of embodiment, the switch 472 is replaced by a diode mounted top to tail with the diode 452. Thus, in normal operation, because the electric voltage of the main source is higher than that of the auxiliary source, the diode 472 is blocked. If the voltage of the main source drops, the diode 472 is automatically unblocked so that the devices that control the brake boosting device can be powered.

LIST OF PARTS

100 Master cylinder
101, 102 Chambers of the master cylinder
103 Primary piston
104 Secondary piston
105 Thrust chamber
110 Brake fluid reservoir
120 Transmission member
121 Piston
122 Control rod
123 Spring
200 Electrically operated valve
210 Spool
211, 212, 213 Sectors of the spool 210
220 Actuator
231 Line
300 Pressure accumulator
301 Cylinder
302 Piston
303 Chamber
304 Opposing springs
350 Electrically operated pump
351 Cylinder
352 Piston
353 Pressure chamber
354 Rod of the piston 352
355 Nut
356 Electric motor
360 Non-return valve
400 Computer
410 Sensor
411 Brake pedal
450 Main electrical power source
451 Vehicle battery
452 Diode
460 On-board circuit
470, 471 Auxiliary electrical power source
473 Status indicator
C1, C2 Brake circuits
L0, L1, L2, L3 Electric circuit

The invention claimed is:

1. A hydraulically boosted hydraulic braking system comprising:
   a master cylinder (100) including a thrust chamber (105) which receives, on command, pressurized brake fluid from an accumulator (300) via an electrically operated valve (200) controlled by a brake control computer (400) on the basis of a signal (CP) supplied by a brake pedal sensor (410),
   a main electrical power source (450) connected to a brake control electrical circuit (L0, L1, L2, L3) and powering at least the electrically operated valve (200), the brake control computer (400) and the brake pedal sensor (410), characterized by an auxiliary electrical power source (470) connected by a controlled electronic switch (472) to the brake control electrical circuit (L0, L1, L2, L3) powering the brake control computer (400), the brake pedal sensor (410) and the electrically operated valve (200) if failure of the main electrical power source (450) is detected so as to allow emergency operation of the electrically operated valve (200) and allow a brake circuit (C1, C2) to be powered for a limited number of braking actions, wherein the controlled electronic switch (472) disconnects the auxiliary electrical power source (470) from the brake control electrical circuit (L0, L1, L2, L3) during normal operation;
   wherein the electrically operated valve (200), the brake control computer (400) and the brake pedal sensor (410) are connected to the main electrical power source (450) independently of an on-board circuit (460) of a vehicle by a line and by a one-way electronic component (452) that allows current from the main electrical power source (450) to pass only to the electrically operated valve (200), the brake control computer (400) and the brake pedal sensor (410) and not in the opposite direction.

2. The hydraulic braking system according to claim 1, characterized in that the controlled electronic switch (472) is a thyristor.

3. The hydraulic braking system according to claim 1, characterized in that the auxiliary electrical power source (470) is connected to a status indicator (473) that indicates that the auxiliary electrical power source (470) is in operation.

4. The hydraulic braking system according to claim 1, characterized in that the brake control electrical circuit (L0, L1, L2, L3) is connected to the main source (450) by the one-way electronic component (452) that prevents the main electrical power source (450) from being recharged by the auxiliary electrical power source (470).

5. The hydraulic braking system according to claim 4 wherein the one-way electronic component (452) is a diode.

6. The hydraulic braking system according to claim 1, characterized in that the auxiliary electrical power source (470) comprises a battery or a cell (471).

7. The hydraulic braking system according to claim 1, characterized by a connection between an electrically operated pump (350) and the on-board circuit (460) which connection is independent of the brake control electrical circuit (L0, L1, L2, L3) powering the electrically operated valve (200), the brake control computer (400) and the brake pedal sensor (410).

* * * * *